United States Patent
Jakonen et al.

(10) Patent No.: US 7,689,172 B2
(45) Date of Patent: *Mar. 30, 2010

(54) REDUCING INTERFERENCE BETWEEN DEVICE COMPONENTS

(75) Inventors: Joonas Jakonen, Oulu (FI); Marko Leinonen, Haukipudas (FI)

(73) Assignee: Nokia Corporation, Espoo (FI)

( * ) Notice: Subject to any disclaimer, the term of this patent is extended or adjusted under 35 U.S.C. 154(b) by 475 days.

This patent is subject to a terminal disclaimer.

(21) Appl. No.: 11/762,595

(22) Filed: Jun. 13, 2007

(65) Prior Publication Data

US 2008/0311875 A1    Dec. 18, 2008

(51) Int. Cl.
*H04B 1/00*    (2006.01)
(52) U.S. Cl. ................................. 455/63.1; 455/295
(58) Field of Classification Search ................ 455/63.1, 455/295; 370/347, 311
See application file for complete search history.

(56) References Cited

U.S. PATENT DOCUMENTS

2007/0298717 A1*   12/2007   Palin et al. ................. 455/63.1

FOREIGN PATENT DOCUMENTS

WO       2006/045877 A1       5/2006

OTHER PUBLICATIONS http://digital-lifestyles.info/display_page.asp?section=platforms &id=2734; Digital-Lifestyles.info; Mike Slocombe; Nokia N92 with DVB-H Receiver, N80, N71 Announced; Nov. 2, 2005; retrieved from Internet Jun. 6, 2006.

M. Morris Mano and Charles R. Kime; Logic and Computer Design Fundamentals; 11-3 I/O Interfaces; Chapter 11/ Input-Output and Communication; pp. 540-551; © 1997 by Prentice Hall, Inc.

David A. Patterson and John L. Hennessy; Computer Organization & Design—The Hardware/Software Interface; 8.1 Buses: Connecting I/O Devices to Processor and Memory; pp. 655-687, © 1998 by Morgan Kaufmann Publishers, Inc.

* cited by examiner

*Primary Examiner*—Matthew D Anderson
*Assistant Examiner*—David Bilodeau
(74) *Attorney, Agent, or Firm*—Banner & Witcoff, Ltd.

(57) ABSTRACT

Systems and methods that are adapted to avoid radio frequency interference, electromagnetic interference, and/or electromechanical interference originating from modules, peripherals and interconnects of an electronic device, such as a mobile terminal, that are generating unintentional radiation (e.g. memory cards, camera flashes, data buses etc.) and coupling to the radios of the same electronic device are disclosed. The systems may include a controller unit that schedules the operation of the components to avoid concurrent operation of radios and sensitive peripheral devices which may interfere with each other during concurrent operation.

28 Claims, 3 Drawing Sheets

REDUCING INTERFERENCE BETWEEN DEVICE COMPONENTS

FIELD OF THE INVENTION

This invention relates generally to interference emitted from components in close proximity in an electronic device. More particularly, aspects of the invention relate to systems, apparatuses, and methods for reducing interference problems among components in an electronic device.

BACKGROUND OF THE INVENTION

An increasing number of mobile terminals place radio technologies and non-radio technologies in an integrated housing. Many new mobile terminals feature a camera, an external memory card drive to enhance storage capacity, and some are able to receive digital television transmission through an integrated digital video broadcast for handhelds (DVB-H) receiver. Some feature the ability of the mobile device to support multiple applications. Hence, in practice there are more and more components active at the same time within the same device, creating a challenging situation both from electromagnetic compatibility (EMC) and resource management point of view.

Basic EMC issues and related design rules have been known already for a long time. Some solutions have been developed to allow components integrated in a single housing to operate without excessively interfering with each other. While mechanical shielding, filtering, and component placement (i.e., locating potentially interfering components as far apart as possible in a housing) have been used in the past to reduce interference, these approaches are limited as the physical separation between components gets smaller. In addition, interference from unwanted sources, i.e., from other radios and also from unintentional non-radio components, becomes more severe as more components are placed in closer proximity. Hence, EMC and interference (e.g., electromagnetic interference, electromechanical interference, and radio frequency interference) issues inside the terminal are already getting more severe.

It has become apparent that prior art techniques that consider only radios of a mobile terminal to avoid interference situations and ensure good user experience are not sufficient. Some sort of interoperability solution should be extended to include non-radio components of the mobile terminal as well. Therefore, there is a need in the art for a widely applicable solution reducing or eliminating interference between components, both radio and non-radio, in a mobile terminal.

SUMMARY OF THE INVENTION

The following represents a simplified summary of some embodiments of the invention in order to provide a basic understanding of various aspects of the invention. This summary is not an extensive overview of the invention. It is not intended to identify key or critical elements of the invention or to delineate the scope of the invention. Its sole purpose is to present some embodiments of the invention in simplified form as a prelude to the more detailed description that is presented below.

In order to overcome the aforementioned deficiencies in the prior art and other problems that will become apparent after reading this disclosure, the present invention provides systems, apparatuses, and methods for the reducing and/or eliminating of interference affecting other components in an electronic device. A controller unit adjusts the operation of the components in alignment with radio activity of the device.

In one embodiment, an apparatus comprising a memory unit, processor, components, and a controller unit is disclosed. The controller unit may use interference rules and other information to determine whether the operation of one component will interfere with the operation of another component in an active state. The components may be radio or non-radio components, such as a DVB-H receiver, cellular transceivers, FM receivers, a camera unit with a flash, flash memory drive, hard drive with a rotating motor, vibration motor, loudspeaker, Bluetooth transceiver, and USB/Firewire interface. In an alternative embodiment, the controller unit is capable of modifying the properties of one or more clock signals generated by a clock signal generation unit either in a time or a frequency domain which is being provided to a radio and/or non-radio component.

In another embodiment, a mobile terminal comprising a processor, a radio component, a non-radio component, and a controller unit is disclosed. The mobile terminal performs an operation using the radio component and another operation using the non-radio component. The controller unit ensures that the operations do not overlap, thus reducing interference between the two components. The length of each time allocated to each operation may be based on characteristics of the radio component.

In yet another embodiment, a method of reducing interference among components in an electronic device is disclosed. The method comprises receiving an activation request, determining if the activation request could be granted without resulting in interference between active components, transmitting an activation control signal, performing an operation using the active component, and transmitting a deactivation control signal. The controller unit is able to change the state (e.g., active or sleep) of the components in accordance with interference rules and other information available to the controller unit. Furthermore, in some embodiments, the radio component operates in burst of a predetermined length with fixed sleep periods in between. In an alternative embodiment, a computer-readable medium storing computer-executable instructions for performing the aforementioned method is also disclosed.

DETAILED DESCRIPTION OF THE INVENTION

In accordance with various aspects of the invention, systems, apparatuses, and methods for scheduling operation of components in an electronic device in order to reduce electromagnetic interference are disclosed. For example, in systems using time-slot transmission, e.g., TDD (time division duplex) or TDM (time division multiplexing), there is typically a number of free slots that are available for other activities. These other activities may be time aligned to the free slots such that any electromagnetic radiation generated, either intentionally or unintentionally, is reduced and/or eliminated.

Figure 1:
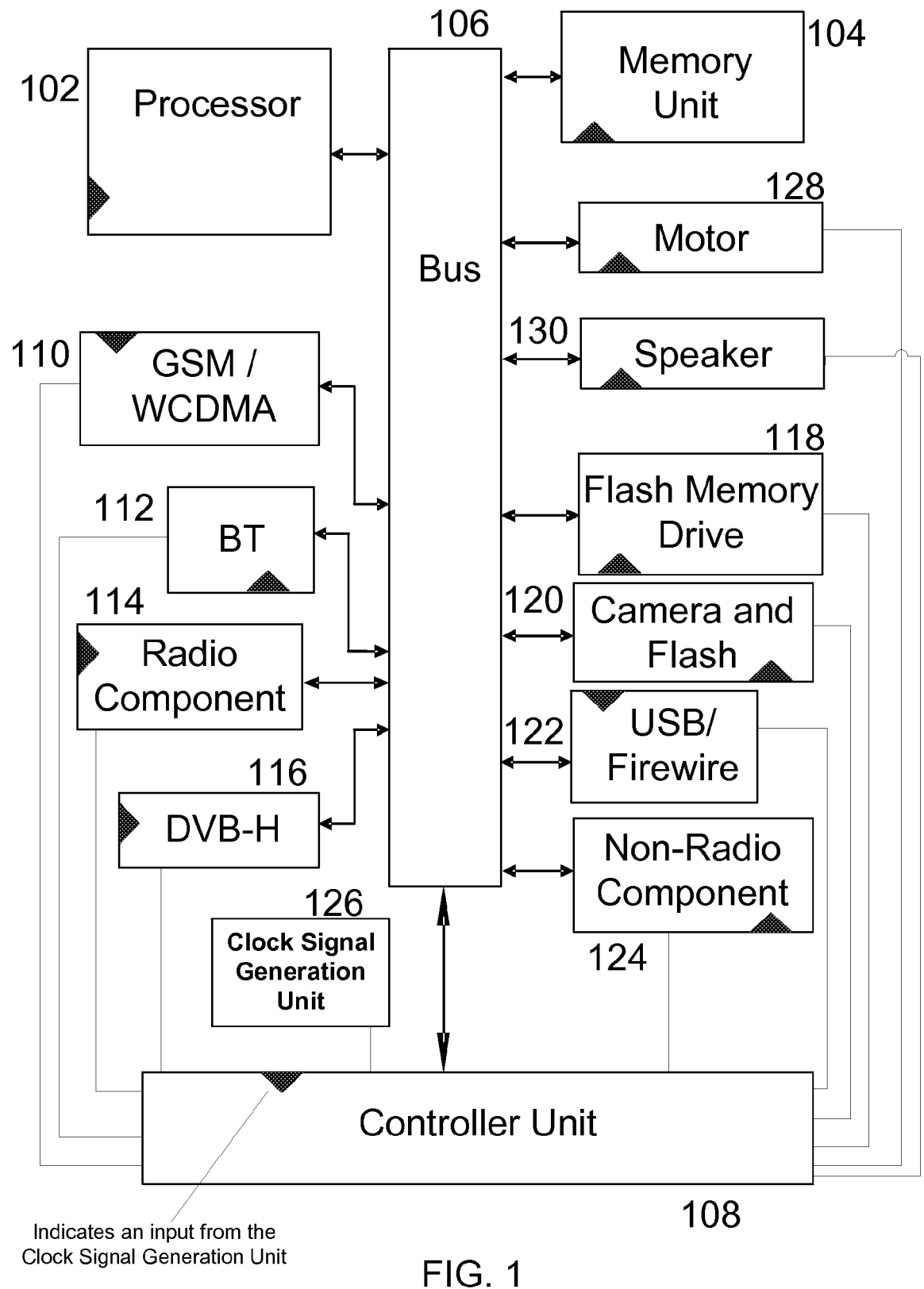
FIG. 1 depicts an illustrative electronic device in accordance with aspects of the invention.

FIG. 1 illustrates an apparatus in accordance with various aspects of the invention. The apparatus may be a mobile device, such as a personal digital assistant (PDA), cellular phone, handheld multimedia device, mobile terminal, or other electronic communications device. The apparatus may comprise a memory unit 104, a processor 102, a plurality of components, and a controller unit 108. The memory unit may include non-volatile memory capable of storing information even when no power source is available at the apparatus. The processor, which may be in communication with the memory unit, may execute computer-executable instructions stored in the memory unit. Alternatively, the processor may be preconfigured with computer-executable instructions. Moreover, aspects of the invention may be implemented in a computer-readable medium as computer-executable instructions for performing a method in accordance with aspects the invention.

The plurality of components includes at least one radio component and at least one non-radio component. A component is categorized as a radio component if it is designed to transmit and/or receive electromagnetic waves (e.g., operates using an antenna, transmits infrared light, etc.). Examples of radio components 114 include, but are not limited to, a Bluetooth transceiver 112, a cellular transceiver 110 (e.g., GSM/WCDMA transceiver), a FM receiver, a DVB-H receiver 116, an infrared transceiver, WLAN sub-system, Wi-Fi transceiver, and other circuitry using an antenna.

On the other hand, it follows that a component may be categorized as a non-radio component if it operates without using an antenna (i.e., it is not a radio component). Examples of non-radio components 124, include but are not limited to, a flash memory drive (e.g., a SD memory card reader/writer) 118, memory bus 106, a camera unit including a camera flash 120, a motor 128 (e.g., in a hard drive, a vibration-motor in a mobile phone, etc.), stereo speaker 130 (e.g., in a headset or in a speaker box), USB/Firewire interface 122, and other similar devices. One or more of the non-radio components may comprise an electromechanical device that emits electromechanical interference when operated. Examples of electromechanical components include, but are not limited to, motors 128, speakers 130, vibrator motors for caller alert (e.g., vibrating) in response to an indication of an incoming calls, motors for optical zooms, fans for the processors and terminal inner cooling, and other similar mechanical devices. A hard drive may include a memory with an electromechanical component (e.g., motor 128 and/or other mechanical aspects) for accessing the memory. Other examples of motors include rotating motors in magnetic cassette, CD, DVD and hard disk drives, opening motors for mechanical moving elements like hinge, slide and other mechanisms, and driving motors for moving mobile terminal.

Each component, depending on its type, may have characteristics and/or settings describing the operation of the component. For example, the characteristics of a DVB-H receiver may include, but are not limited to, a reception burst length characteristic and a sleep period characteristic. DVB-H uses time slicing, therefore, in one embodiment, DVB-H frames are transmitted in bursts of approximately 200-500 milliseconds (ms). Between the bursts the DVB-H receiver does not receive anything (i.e., the DVB-H receiver is in sleep mode for approximately 1.2 second to 2 seconds). In the example of DVB-H receivers, DVB-H transmissions include parameters that report the receiver's reception burst length and (maximum) burst length time. Some DVB-H engine versions report the sleep and activity periods in advance as well. Typically the time slicing characteristics of a DVB-H receiver remain constant even though the standard allows this characteristic to be modified. By utilizing the reception burst length characteristic and sleep period characteristic, the operation of other components (e.g., non-radio components or interfering radio components) may be rescheduled or adjusted to reduce and/or eliminate interference with the operation of the radio component.

Similarly, the settings of a flash memory drive may include, but are not limited to, a block size setting and a clock frequency setting. The write and read operations on flash memory devices (e.g., secure digital (SD) memory devices) are typically done in blocks. The most common block size for SD write and read operations is 512 bytes. The clock frequency setting on a SD memory device can typically be set to between 0 and 25 MHz (or 0 to 50 MHz on flash memory devices that support high-speed mode). In addition, an SD memory drive can be used either in 1-bit or 4-bit mode, and that selection may also be stored as a setting of the flash memory device.

The plurality of components may communicate among themselves and other units in the apparatus through a bus 106. Examples of different types of buses include a processor-memory bus, I/O bus, and backplane bus. One skilled in the art will appreciate that there are benefits and drawbacks associated with each type of bus. For example, a backplane bus may require additional logic to interface between the bus and a component.

The controller unit 108 may also communicate with the plurality of components and other units (e.g., memory unit, processor, etc.) in the apparatus through the bus 106. The controller unit 108 may be configured to execute computer-executable instructions to perform a method for reducing and/or eliminating interference between components in the apparatus. In particular, the steps performed to this method in accordance with the invention are discussed in greater detail with reference to FIG. 2.

The controller unit 108 may include memory for storing characteristics and/or settings corresponding to the components in the electronic device. For a DVB-H receiver radio component 116, the controller unit 108 may store a reception burst length characteristic and a sleep period characteristic of the DVB-H receiver. Meanwhile, for a flash memory drive 118, the controller unit 108 may store a block size setting and a clock frequency setting of the flash memory device. The controller unit 108 may use characteristics and/or settings corresponding to the components in the electronic device to determine whether to transmit an activation or a deactivation control signal to a component.

The controller unit 108 reduces and/or eliminates interference between the components in the electronic device by scheduling and controlling the activity of the components. In one embodiment, the controller unit divides the operation time between radio and non-radio components by means of scheduling using arbitration logic. The invention controller may comprise arbitration logic for arbitrating between the various components requesting to be put in an active state using methods known to those skilled in the art of bus arbitration. For example, factors such as priority and fairness may be considered and/or balanced in determining which components will be granted active status. For example, components may be assigned a priority (e.g., high, low, 1, 2, 3, etc.), and components may be served, at least in part, based on higher priority preference. Fairness may also be considered to ensure that a low priority component is never completely locked out from entering the active status. One skilled in the art will appreciate that different schemes exist for implementing arbitration logic: daisy chain arbitration, centralized parallel arbitration, distributed arbitration by self-selection, distributed arbitration by collision detection, and variations of these approaches are just some examples. Naturally, the controller unit 108 may allow the non-radio and radio components to operate simultaneously if there is no interference problem.

In one example in accordance with aspects of the invention, the apparatus includes a clock signal generation unit 126 for generating one or more clock signals for the components in the apparatus. In one example, the clock signal generation unit 126 may produce a clock signal in at least one of: a sine wave format, a sliced sine wave format, or a digital format. For purposes of visual representation, the input from the clock signal generation unit 126 into a component is represented by a dark triangle on each component. Based on the characteristics and/or settings corresponding to the component and any other components in the active state, the controller unit may adjust the frequency of the clock signal sent to the component. At least one benefit of sending a modified clock signal to the component is that it may be used to reduce the interference to an acceptable level. Thus, permitting multiple components to be in the state active and performing operations simultaneously. In another embodiment, the controller unit is allowed to stop the clock signal provided to the non-radio component, and as a result, the unfinished operation continues from where it was stopped once the clock is started. The non-radio component may be rescheduled using the modified clock signal in such a way that the write/read operations can be finalized between the bursts of a DVB-H receiver.

In another embodiment in accordance with various aspects of the invention, the clock signal generation unit 126 for generating a clock signal for a particular component may change the shape of the generated clock signal. The shape of the clock signal in the time domain may define the clock signal frequency domain information. If there are fast changes in time domain signal, then it generates high frequency components for the signal frequency domain. In order to reduce interference with the clock frequency harmonics of the digital clock signal with the higher frequencies of the, for example, radio receivers, it may be desirable to modify the rise time of the signal. For example, if the signal is filtered such that the rise time is lowered, then high frequency content may be reduced and radio components may operate with better performance. The time domain and/or frequency domain properties of any one or more of the clock signals may be modified accordingly. Furthermore, the shape of the clock signal may be modified by changing the rise and fall speed of the signal. Alternatively, the shape of the signal can be changed by modifying the time domain shape of the signal by, for example, changing the filtering of the clock signal according to the activity of radio components 114 and non-radio components 116 or according to which radio components 114 and non-radio components 116 are active or present in the apparatus (e.g., mobile phone). In another embodiment, the activity of the various components may be used to change the filtering of the clock signal such that the clock signal frequency domain content is changed to reduce interference.

In yet another embodiment in accordance with aspects of the invention, a clock signal generation block 126 may produce a plurality of clock signals which are used by several sub-systems. The actual clock signals and the distribution of the clock signals are not shown in FIG. 1 in order to keep block diagram in an easy-to-read format. In one example, the sub-systems may be a DVB-H receiver 116, Bluetooth transceiver 112, non-radio component 124, and cellular connectivity transceiver 110. If all sub-systems are using dedicated clock signals, then the properties of the each signal may be modified separately to, among other things, reduce the interference from system to another system. In one embodiment, the clock signal generation for an interfering non-radio sub-system may be deactivated during operation of the radio sub-system. As such, the interfering non-radio sub-system is deactivated since there is no base clock available for normal operation.

In accordance with aspects of the invention, at least some benefits of the invention are the improved performance from the point of view of power consumption, flexibility to electronic device design by allowing more freedom in the placement of components, lower cost due to the elimination of unnecessary filtering, and flexibility of implementing aspects of the invention in either software or hardware. In addition, electronic devices implemented using aspects of the invention may result in smaller product housing (e.g., smaller mobile phones).

Figure 2:
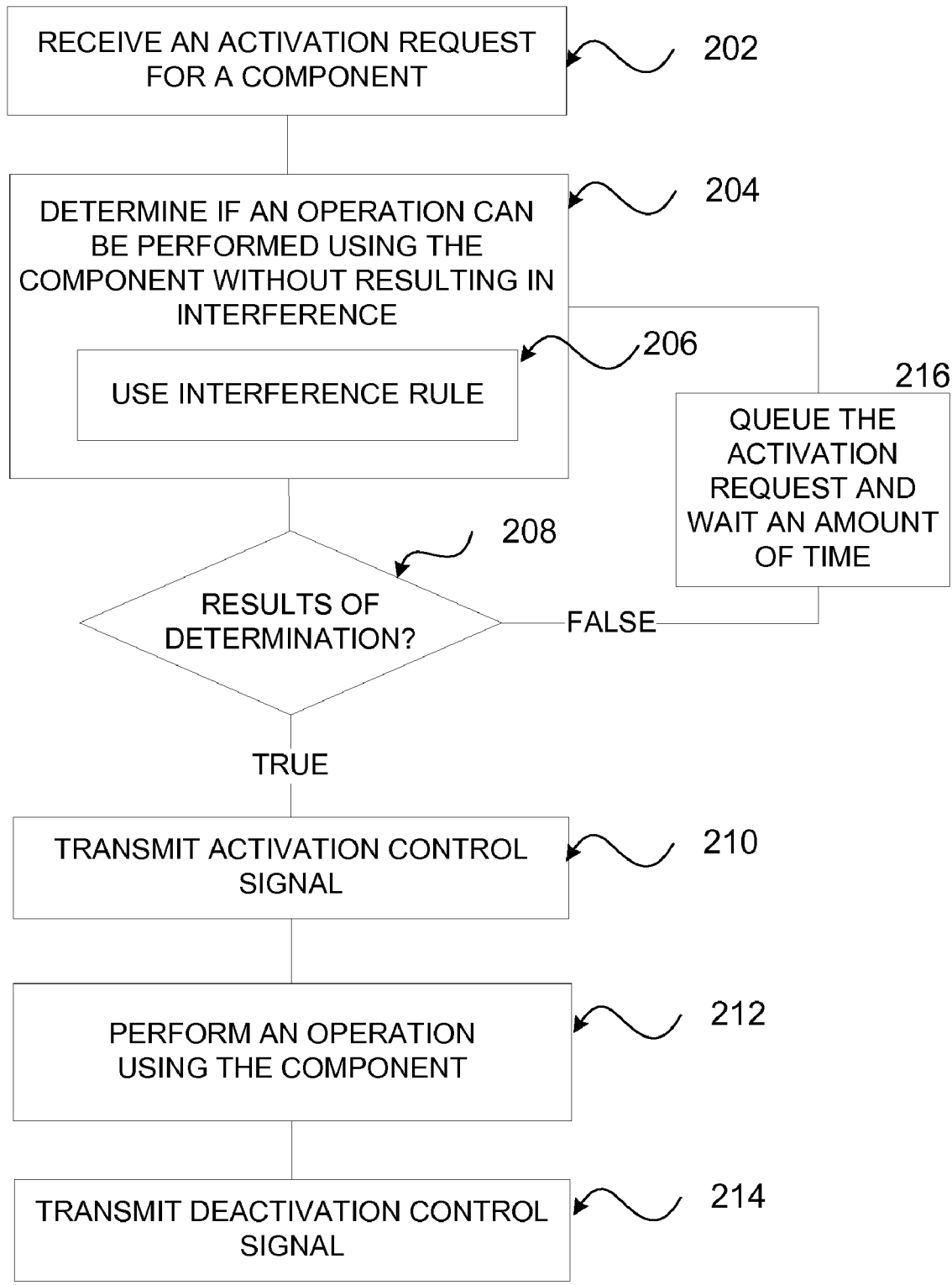
FIG. 2 shows an illustrative flowchart of a method for reducing interference in an electronic device in accordance with aspects of the invention.

FIG. 2 shows an illustrative flowchart of a method for reducing interference in an electronic device in accordance with aspects of the invention. The electronic device may be performing an operation using a radio component during an interval between a first time and a second time. The radio component is in an active state during that interval. The active state corresponds to the state of a component when it is powered and ready to perform an operation. In contrast, the sleep state is the state of a component when almost all of the circuitry of the component is powered down (e.g., in a hibernation state) and the component is not ready to perform an operation. A component in the sleep state is unaffected by interference from other components. In other words, if the immediate operation of a component is capable of being harmed by interference from others, then that component is in the active state. One of skill in the art will appreciate that the active state and sleep state of components in accordance with aspects of the invention is similar to those readily known in the art.

In step 202, the controller unit 108 receives an activation request for a non-radio component 124 in the electronic device. An activation request may be an action by the component to indicate that the component desires to perform an operation. An activation request may be implemented in various ways. For example, the activation request may be implemented using a polling scheme where the component flags a register to indicate an activation request. In another example, the activation request may be implemented using interrupts to trigger an activation request.

The controller unit 108 in step 204 determines if an operation can be performed using the non-radio component 124 without resulting in interference with any one of the plurality of components in the electronic device that are in an active state. Arbitration circuitry, e.g., in the controller unit, may be used to perform at least part of step 204. The controller unit 108 may make the determination of step 204, at least partly, based on the characteristics and/or settings of the components in an active state and the requesting non-radio component 124. Furthermore, the controller unit 108 may (in step 206) use interference rules to help make the determination of step 204. The interference rules may be pre-programmed into the controller unit 108 using hardware, such as logic gates and circuitry, or may be pre-programmed using software, such as microcontroller code.

If the results of the determination of step 204 indicate that interference would occur if the requesting component was granted active status (in step 208), then the electronic device may wait (in step 216) a random amount of time before again requesting that a determination be made. One skilled in the art will appreciate that factors such as priority and fairness may be considered when calculating the random amount of time to hold the activation request in a queue before rescheduling the determination in step 204. If, however, the results of the determination of step 204 indicate that interference would not occur if the requesting component was granted active status (in step 208), then the controller unit 108 may transmit an activation control signal for the non-radio component 124 in step 210. In response to step 210, the non-radio component 124 may enter an active state.

Since the non-radio component 124 is in an active state, in step 212, the non-radio component 124 may be permitted to perform an operation. An example of an operation that a radio component (e.g., a DVB-H receiver 116) may perform includes receiving data corresponding to a television broadcast signal. Meanwhile, an example of an operation that a non-radio component (e.g., flash memory drive 118) may perform includes writing data corresponding to a television broadcast signal received by a DVB-H receiver 116 to the memory in a flash memory drive 118.

In step 214, the controller unit 108 transmits a deactivation control signal for the non-radio component 124. In response, the non-radio component 124 may be placed in a sleep state. The controller unit 108 may transmit the deactivation control signal automatically after the elapse of a predetermined amount of time, or alternatively, may transmit the deactivation control signal in response to receiving the appropriate interrupt.

Similar to step 202, the controller 108 unit may also receive an activation request for a radio component 114. Like in step 204, the controller unit 108 will make a determination if an operation can be performed without resulting in interference and act accordingly. In one embodiment in accordance with aspects of the invention, radio components 114 may be assigned a higher priority setting in the arbitration logic of the controller unit such that radio components 114 may be serviced before non-radio components.

In another example, the simultaneous operation of a cellular transmitter (i.e., radio component) and a hard drive (i.e., non-radio component) in the mechanical device creates interference. The results are an unsuccessful writing operation to the hard drive. Emissions originating from the cellular transmissions may be so powerful and coupling losses due to the limited physical separation so small, that the hard drive operation is severely disturbed. In such a case, an appropriate interference rule may be manually created and stored in the controller unit as taught in the publication entitled, "Controlling operation of a memory device", WO2006045877, Leinonen M. E. and Hannula T. (2004).

In addition, the motor in the hard drive may emit electromechanical interference that may affect the operation of the radio component. One of ordinary skill in the art, after reviewing the disclosure herein, will appreciate that although the illustrative electromechanical non-radio component described above is a motor in a hard drive, other electromechanical components, such as a vibration-motor, conventional electric motor, loudspeakers, and others, are contemplated by various aspects of the disclosure. For example, the electromechanical non-radio component may include a vibration-motor in a mobile phone that vibrates in response to an incoming telephone call or notification.

Figure 3:
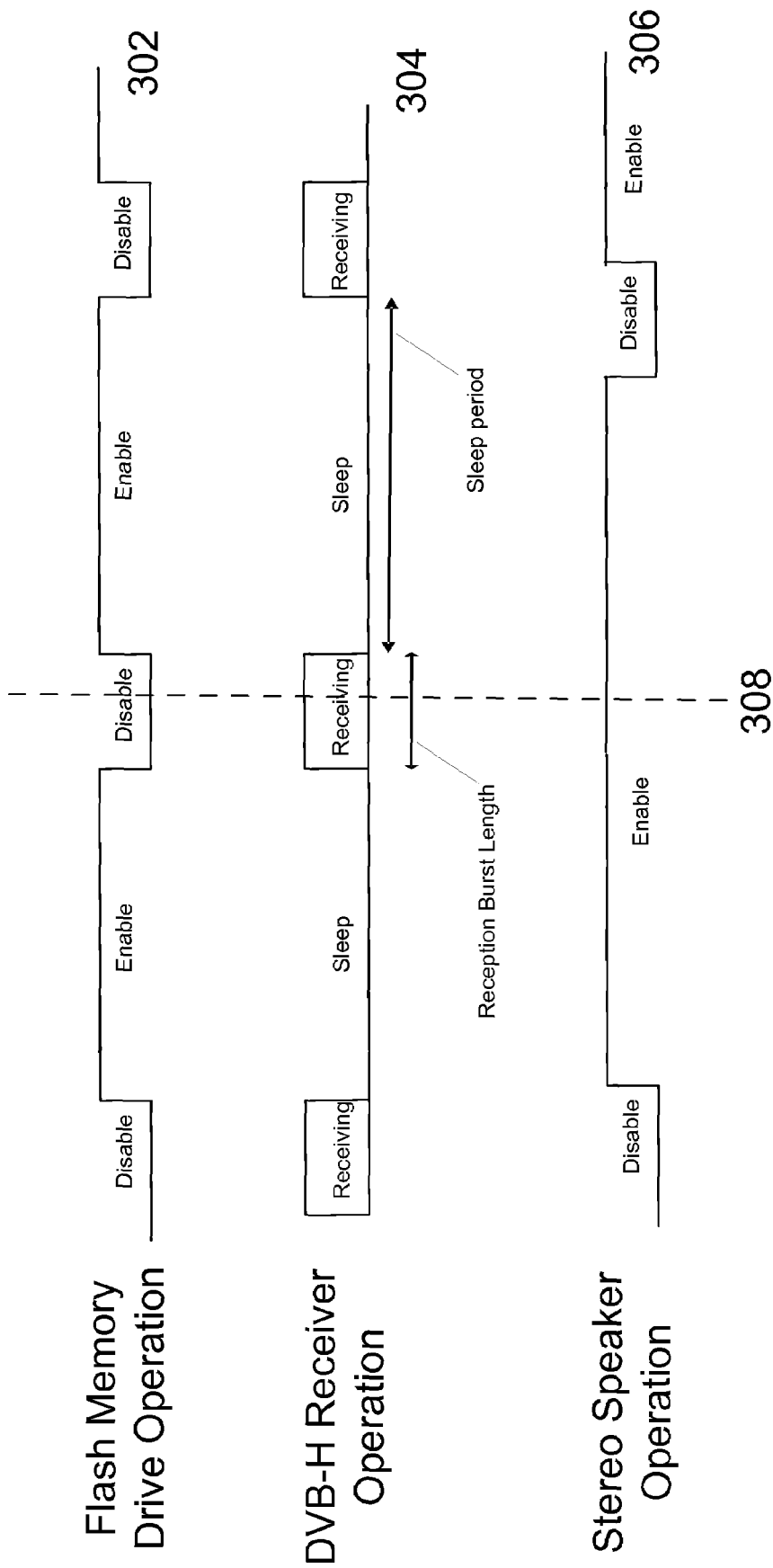
FIG. 3 depicts an illustrative timing diagram of a plurality of components in an electronic device in accordance with aspects of the invention.

In an example referring to FIG. 3, the controller unit determines in step 204 whether a flash memory drive operation 302 may be performed simultaneously with a DVB-H receiver operation 304. DVB-H reception quality/coverage is dramatically compromised if an active flash memory drive is located in close proximity to the DVB-H antenna. It is observed that in certain cases the receiver sensitivity of a DVB-H receiver can be degraded by about 10-15 dB due to the simultaneous operation of a closely located flash memory drive (or other non-radio component that emits interference when operated). Nevertheless, support for the recording of DVB-H television broadcasts to a flash memory drive is a feature desired for enhancing the user experience. In accordance with aspects of the invention, the controller unit may be used to schedule the operations of the interfering components to reduce interference and enhance operability. Similar radio receiver sensitivity degradation can be seen with other non-radio components also. For example, an activated vibration motor with close proximity to a DVB-H receiver may cause radio receiver sensitivity degradation.

Referring to FIG. 3, at time 308, the flash memory drive 118 (i.e., non-radio component) is in a sleep state (e.g., disabled), the DVB-H receiver 116 is receiving data while in an active state, and the stereo speaker (i.e., electromechanical non-radio component 124) is in an active state. In one example, since the operation of the stereo speaker 306 creates no substantial interference with the operation of the DVB-H receiver, both components are simultaneously in an active state. The controller unit 108 may allow any number of components to be simultaneously in the active state, so long as no substantial interference occurs such that the operations are affected. In another example, the operation of the stereo speaker 306 may emit electromechanical interference that conflicts with the operation of the DVB-H receiver. In such an example, the controller unit 108 may coordinate the active states of the interfering components.

In an illustrative mobile terminal with a DVB-H receiver, the receiver may perform an operation to receive data corresponding to a television broadcast signal. Since DVB-H broadcast signals are transmitted in bursts, the reception burst length characteristic of the receiver indicates the duration of the burst to the controller unit. Therefore, the controller unit can use the reception burst length characteristic to calculate when the radio component (e.g., DVB-H receiver) will no longer need to be active. Using this information, the controller unit can schedule the flash memory drive to enter the active state when the DVB-H receiver enters the sleep state. The controller unit is also provided with the sleep period characteristic of the DVB-H receiver. Therefore, the controller unit is able to calculate when the next interval for receiving a DVB-H burst will occur. In other words, the DVB-H receiver receives data during each of a plurality of uniform non-overlapping intervals, each interval lasting a length of time equal to the reception burst length. Moreover, the flash memory drive writes data during the interval of time between two adjacent uniform non-overlapping bursts. The length of time of this interval may correspond to a sleep period characteristic of the radio component (e.g., DVB-H receiver). The receiving operation in the DVB-H receiver is automatically repeated for each of the plurality of uniform non-overlapping intervals. In FIG. 3, the timing diagram shows 3 such uniform non-overlapping intervals.

While it is understood that aspects the invention may be implemented as methods, they may also be implemented in a computer-readable media having computer-executable instructions. Aspects of the invention may be implemented by way of software, hardware, or a combination thereof Computer-readable media include any available media that can be access by a processor in a computing device or system. Other features of the invention will become apparent from the foregoing detailed description when taken in conjunction with the drawings.

The present invention has sometimes been described in terms of preferred and illustrative embodiments thereof. Numerous other embodiments, modifications and variations within the scope and spirit of the appended claims will occur to persons of ordinary skill in the art from a review of this disclosure.

We claim:

1. A method comprising:
performing a first operation using a radio component in an electronic device during an interval between a first time and a second time, wherein the radio component is in an active state during the interval between the first time and the second time, the electronic device comprising a plurality of components including at least one radio component and at least one non-radio component;
receiving an activation request for a non-radio component in the electronic device, where the non-radio component comprises an electromechanical component;
determining if an operation can be performed using the non-radio component without resulting in interference with any one of the plurality of components in the electronic device in an active state; and
if the determination is true, then at a third time, transmitting an activation control signal for the non-radio component, where the third time is between the first time and the second time, and where the non-radio component enters an active state in response to the activation control signal.

2. The method of claim 1, comprising:
if the determination is true, then at a fourth time, transmitting a deactivation control signal for the non-radio component, wherein the non-radio component performs a second operation during an interval between the third time and the fourth time, wherein the non-radio component enters a sleep state in response to the deactivation control signal,
and where the interference is at least one of an electromagnetic interference and an electromechanical interference.

3. The method of claim 2, comprising:
before the first time, receiving an activation request for the radio component;
determining if an operation can be performed using the radio component without resulting in interference with any one of the plurality of components in the electronic device in an active state;
if the determination that an operation can be performed using the radio component without resulting in interference with any one of the plurality of components in the electronic device in an active state is true, then at the first time, transmitting an activation control signal for the radio component, wherein the radio component enters an active state in response to the activation control signal; and
if the determination that an operation can be performed using the radio component without resulting in interference with any one of the plurality of components in the electronic device in an active state is true, then at the second time, transmitting a deactivation control signal for the radio component, wherein the radio component enters a sleep state in response to deactivation control signal.

4. The method of claim 1, wherein more than one of the plurality of components in the electronic device are simultaneously in an active state, and no substantial interference occurs between the more than one of the plurality of components in the active state.

5. The method of claim 1, wherein the determination if an operation can be performed using the non-radio component without resulting in interference with any one of the plurality of components in the electronic device in an active state is performed using at least one interference rule pre-programmed in the electronic device.

6. The method of claim 2, wherein the interval between the first time and the second time corresponds to a reception burst length characteristic of the radio component.

7. The method of claim 6, wherein performing a first operation is automatically repeated for each of a plurality of uniform non-overlapping intervals, wherein the plurality of uniform non-overlapping intervals includes the interval between the first time and the second time, and wherein the period of time between two adjacent non-overlapping intervals is not greater than a sleep period characteristic of the radio component.

8. The method of claim 6, wherein the radio component comprises a DVB-H receiver, and wherein the electromechanical component comprises a motor.

9. The method of claim 8, wherein the first operation includes receiving data corresponding to a television broadcast signal at the DVB-H receiver during one of the plurality of uniform non-overlapping intervals, and wherein the second operation includes vibrating the electronic device in response to receiving an indication of an incoming call at the vibrator motor during the period of time between two adjacent non-overlapping intervals.

10. The method of claim 1, where the radio component uses a first clock signal for the first operation, and where the non-radio component uses a second clock signal for the second operation, and where at least one of the clock signals are modified to reduce interference.

11. The method of claim 10, where in the first clock signal and the second clock signal are one shared signal.

12. The method of claim 10, where at least one time domain property of at least one of the clock signals is modified according to activity of the radio component and the non-radio component.

13. The method of claim 10, where at least one frequency domain property of at least one of the clock signals is modified according to activity of the radio component and non-radio component.

14. The method of claim 13, where frequency of at least one of the clock signals is altered to reduce interference caused by the non-radio component.

15. The method of claim 13, where at least one of the clock signal frequency domain content is changed by filtering the clock signal based on activity of the radio component and non-radio component.

16. The method of claim 1, comprising:
if the determination is false: calculating a random amount of time to wait, and performing the determination after waiting the random amount of time.

17. The method of claim 3, wherein the radio component comprises a cellular transceiver.

18. The method of claim 3, wherein the radio component comprises a FM receiver.

19. The method of claim 2, wherein the non-radio component comprises a stereo speaker.

20. An apparatus comprising:
a memory unit including non-volatile memory;
a processor in communication with the memory unit;
a plurality of components including at least one radio component and at least one non-radio component, where at least one of the at least one non-radio components comprises an electromechanical component;
a clock signal generation unit configured to generate clock signals for the at least one radio component and the at least one non-radio component; and a controller unit, in communication with the processor and the plurality of components, configured to execute computer-executable instructions to perform a method comprising:

receiving an activation request for a component;

determining if an operation can be performed using the component without resulting in any one of electromagnetic interference and electromechanical interference with any one of the plurality of components in an active state, wherein the determination is performed using at least one interference rule;

if the determination is true: transmitting an activation control signal for the component, wherein the component enters an active state in response to the activation control signal.

21. The apparatus of claim 20, where a radio component of the plurality of components comprises a DVB-H receiver, and where a non-radio component of the plurality of components comprises a motor.

22. The apparatus of claim 21, where the motor comprises a vibration-motor.

23. The apparatus of claim 20, wherein the controller unit is configured to control the clock signal generation unit to adjust a frequency of the clock signal generated.

24. The apparatus of claim 20, where a frequency domain property of at least one of the clock signals is modified according to activity of the radio component and non-radio component.

25. The apparatus of claim 20, where a time domain property of at least one of the clock signals is modified according to activity of the radio component and non-radio component.

26. A mobile terminal comprising:

a processor;

a radio component;

a non-radio component including an electromechanical component that emits electromagnetic interference when performing an operation; and a controller unit, in communication with the processor, the radio component, and the non-radio component, configured to execute computer-executable instructions to perform a method comprising:

performing a first operation using the radio component during a first interval of time, wherein a length of the first interval of time corresponds to a reception burst length characteristic of the radio component; and performing a second operation using the non-radio component during a second interval of time, wherein a length of the second interval of time corresponds to a sleep period characteristic of the radio component;

wherein the first interval of time and second interval of time do not overlap.

27. The mobile terminal of claim 26, where the radio component comprises a DVB-H receiver, and where the electromechanical component includes a motor.

28. A computer-readable medium storing computer-executable instructions for performing a method, an electronic device comprising a plurality of components including at least one radio component and at least one non-radio component, the at least one non-radio component including an electromechanical component, the method comprising:

performing a first operation using a non-radio component in the electronic device during an interval between a first time and a second time, where the non-radio component is in an active state during the interval between the first time and the second time;

receiving an activation request for a radio component in the electronic device;

determining if an operation can be performed using the radio component without resulting in interference with any one of the plurality of components in the electronic device in an active state;

if the determination is true: at a third time, transmitting an activation control signal for the radio component, where the third time is between the first time and the second time, and where the radio component enters an active state in response to the activation control signal; and if the determination is false: performing the determination after waiting a random amount of time.

* * * * *